United States Patent [19]
Wallace

[11] Patent Number: 5,251,433
[45] Date of Patent: Oct. 12, 1993

[54] POWER GENERATION PROCESS

[75] Inventor: Paul S. Wallace, Katy, Tex.

[73] Assignee: Texaco Inc., White Plains, N.Y.

[21] Appl. No.: 996,271

[22] Filed: Dec. 24, 1992

[51] Int. Cl.$^5$ .................. F02B 43/12; F02C 3/28; F02C 3/30
[52] U.S. Cl. .................. 60/39.05; 48/197 R; 60/39.02
[58] Field of Search .......... 48/197 R, 202, 203, 48/206; 60/39.02, 39.05, 39.12, 39.182

[56] References Cited

U.S. PATENT DOCUMENTS

| | | | |
|---|---|---|---|
| 3,866,411 | 2/1975 | Marian et al. | 60/39.05 |
| 4,019,314 | 4/1977 | Springmann | 60/39.02 |
| 4,075,831 | 2/1978 | McGarin | 60/39.05 |
| 4,261,167 | 4/1981 | Paull et al. | 60/39.02 |
| 4,697,413 | 10/1987 | Pohl | 48/197 R |
| 5,117,623 | 6/1992 | Arumdale | 60/39.05 |

*Primary Examiner*—Peter Kratz
*Attorney, Agent, or Firm*—George J. Darsa; James J. O'Loughlin; Albert Brent

[57] ABSTRACT

Hot raw fuel gas is produced by the partial oxidation of liquid or gaseous hydrocarbonaceous fuel or an aqueous slurry of solid carbonaceous fuel with substantially pure oxygen. The raw fuel gas is cleaned, cooled in a plurality of indirect heat exchangers, and purified to produce clean sulfur-free fuel gas. Water is the coolant in one of said indirect heat exchangers and is thereby heated. Dry nitrogen gas is humidified with the warm water and the humidified nitrogen gas is separately introduced into the combustor of a combustion turbine. The clean sulfur-free fuel gas is passed in indirect heat exchange with the raw fuel gas, expanded to reduce its temperature and pressure, and separately introduced into the combustor where it is burned with air while in the presence of the water humidified nitrogen gas. Flue gas containing water humidified nitrogen gas and a substantially reduced amount of NO$_x$ gases is produced and passed through a power-producing expansion turbine as the working fluid. Increased power and efficiency are thereby obtained without polluting the atmosphere.

16 Claims, 1 Drawing Sheet

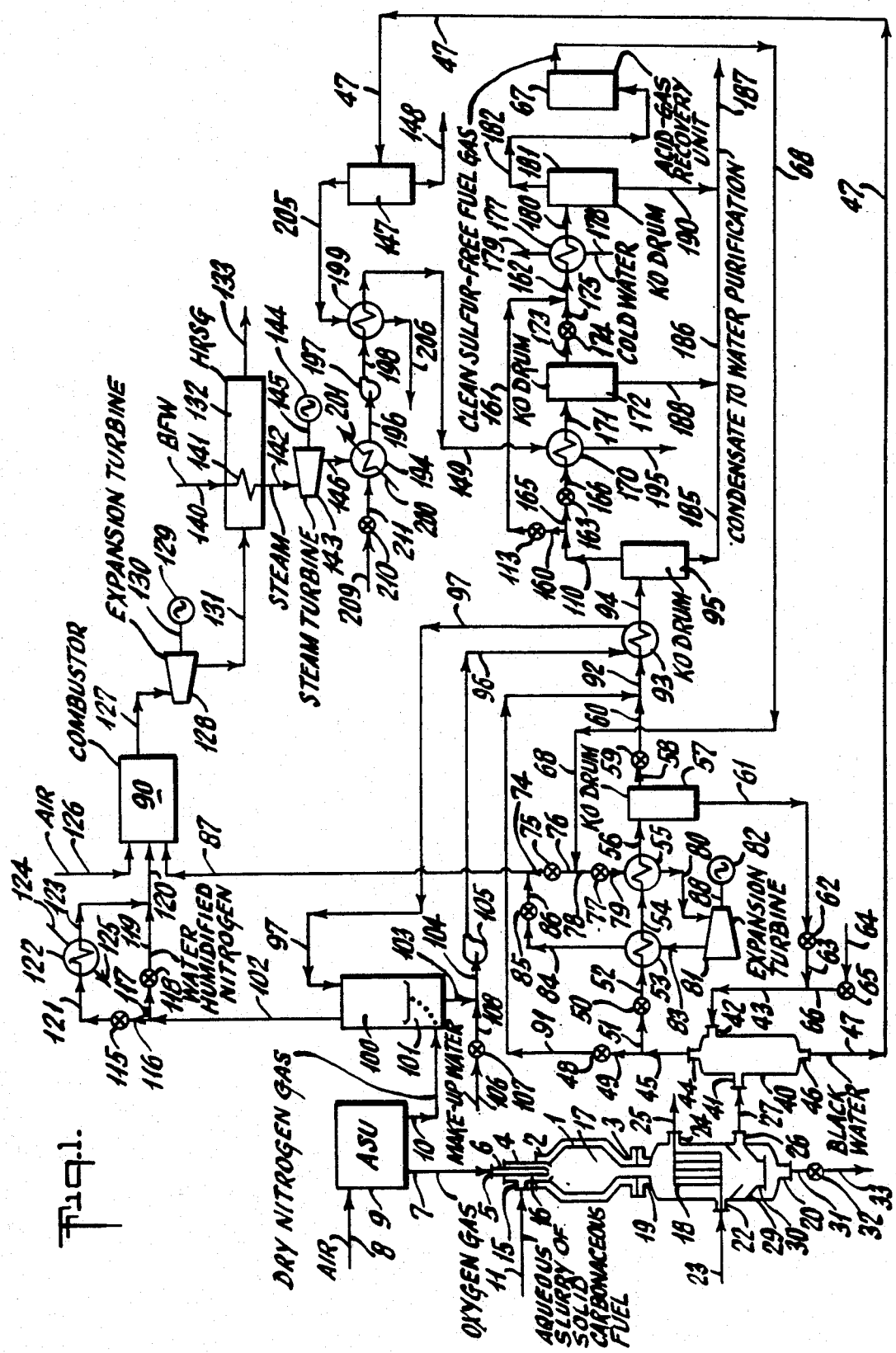

POWER GENERATION PROCESS

BACKGROUND OF THE INVENTION

1. Field of the Invention

Fuel gas and supplemental water humidified nitrogen are separately introduced into the combustor of a gas turbine where combustion with air takes place and flue gas containing water humidified nitrogen gas and a substantially reduced amount of $NO_x$ gases is produced. The flue gas is passed through a power-producing expansion turbine as the working fluid. Increased power and efficiency are thereby obtained without polluting the atmosphere.

2. Description of Prior Art

Production of fuel gas by partial oxidation of a hydrocarbonaceous fuel using comparatively high steam to fuel weight ratios and no subsequent catalytic methanation step is described in coassigned U.S. Pat. No. 3,688,438. In coassigned U.S. Pat. No. 3,868,817 fuel gas having a mole ratio ($CO/H_2$) dry basis of at least 0.30 is produced by partial oxidation in the presence of a $CO_2$-rich temperature moderator. After further processing, the fuel gas is burned in a combustion turbine. In coassigned U.S. Pat. No. 4,075,831 purified and humidified fuel gas is burned in a gas turbine to produce mechanical work and electrical energy. A mixture of air/steam is mixed with fuel and burned to drive a gas turbine in U.S. Pat. No. 4,537,023. However, the prior art does not teach or suggest the instant invention wherein clean sulfur-free fuel gas and supplemental water humidified nitrogen are separately introduced into the combustor of a gas turbine where combustion with air takes place and flue gas containing water humidified nitrogen and substantially lower $NO_x$ gases are produced. Further, there is no teaching in the prior art that the water used to humidify the dry nitrogen is warmed by cooling raw fuel gas prior to purification.

SUMMARY

The subject process pertains to the production of mechanical and/or electrical power by the following steps:

(1) cooling a stream of scrubbed raw fuel gas comprising $H_2$, CO, $H_2O$ and at least one acid gas selected from the group consisting of $CO_2$, $H_2S$, COS, and mixtures thereof, below the dew point in a plurality of separate indirect heat exchange means with a plurality of separate streams of coolant; separating condensed water from said raw fuel gas in a plurality of knock-out drums to produce dewatered raw fuel gas; wherein at least one stream of said coolant is water and said water is circulated in a closed loop between a nitrogen humidifying means where the temperature of said coolant water is reduced and at least one of said indirect heat exchange means where the temperature of said coolant water is increased and the temperature of the stream of raw fuel gas is reduced;

(2) directly contacting dry nitrogen gas at a temperature in the range of about 100° to 600° F. and a pressure in the range of about 200 to 500 psig with said warm coolant water from (1) in said nitrogen humidifying means thereby heating said nitrogen and humidifying it with water while simultaneously cooling the coolant water; and recycling the cooled coolant water to said indirect heat exchange means in (1) to cool said raw fuel gas stream;

(3) scrubbing the dewatered raw fuel gas from (1) with an acid gas solvent in an acid gas removal zone thereby removing any sulfur-containing gases and optionally $CO_2$ from said fuel gas to produce dewatered sulfur-free fuel gas;

(4) separately introducing the dewatered sulfur-free fuel gas stream from (3) and said stream of water humidified nitrogen gas from (2) into a combustion zone and burning the mixture with air to produce flue gas; and (5) passing the flue gas from (4) through an expansion turbine to produce mechanical and/or electrical power.

The benefit of using water humidified nitrogen in the combustor is that the power block combustion turbine will produce more power, have a higher efficiency, and produce lower $NO_x$ emissions. The efficiency will increase since the mass flow going through the turbine will increase with only a small loss of steam turbine power. The combustion turbine will produce more power at high ambient (90° F.) since the cooling flow will increase, allowing more fuel to be fed to the combustion turbine. The $NO_x$ emissions from the combustion turbine will decrease with the addition of the water humidified nitrogen since the flame temperature will be lower.

BRIEF DESCRIPTION OF THE DRAWING

The invention will be further understood by reference to the accompanying drawing. The drawing is a schematic representation of a preferred embodiment of the process.

DESCRIPTION OF THE INVENTION

An important aspect of the subject invention is in the humidifying of nitrogen that is separately fed to a combustion turbine. By this means, the flame temperature in the combustor is kept below that at which $NO_x$ gases are produced. Further, there is a greater mass flow of flue gas working fluid passing through the expansion turbine so that more power is produced at a greater efficiency.

Adding moisture to the nitrogen has the advantage of increasing the volume of inert gas available in the working fluid for the expansion turbine without changing materially the characteristics of the feed components to the combustion turbine. Less nitrogen need be supplied to the system at a great economic savings. By the instant invention, the power output for a combustion turbine may be varied up or down without increasing the danger of flame-out. Adding the supplementary water humidified or saturated nitrogen has the advantage of increasing the volume of inert gas available in the combustor without materially changing the BTU content of the fuel gas being supplied to the combustor or the quantity and quality of the air supply. Further, the water humidified nitrogen may be delivered to the combustor at a somewhat lower pressure e.g. about 25 to 50 psig less than that which is required for the gaseous fuel and air. A lower pressure requirement for the inert water humidified nitrogen gas has two advantages. First, the compressor used to boost the pressure of the nitrogen taken from the air separation plant will require less energy to boost it to the lower pressure rather than the higher pressure required to supply the fuel and oxygen. Secondly, when the nitrogen gas is humidified a greater quantity of moisture can be incorporated into the same weight of nitrogen using a water supply at the same temperature. This is because nitrogen at the lower pressure occupies a greater volume with the consequence more steam can be distributed in the nitrogen at the same partial pressure of water. This increases further the total volume of gas available from a given supply of nitrogen. Conversely less nitrogen need be compressed to supply the inert gas as $H_2O$ supplements the volume of nitrogen supplied.

The supplemental nitrogen which is humidified with water and directly fed to the combustor in the subject process, and the substantially pure oxygen e.g. greater than 95 mole % which is fed to the partial oxidation gas generator for the production of fuel gas are produced in a conventional air separation unit (A.S.U.). For a description of a typical air separation unit, reference is made to Kirk-Othmer Encyclopedia of Chemical Technology, Third Edition Volume 7, John Wiley & Sons, Pages 229 to 231.

In a nitrogen humidifier, the cold dry nitrogen gas from a conventional air separation unit at a temperature in the range of about 100° to 600° F., such as in the range of about 275° to 400° F., say about 300° F. and a pressure in the range of about 200 to 500 psig such as in the range of about 275 to 350 psig, say about 290 psig is contacted with warm purified water. The water enters the humidifier at a temperature in the range of about 250° to 450° F., is cooled by evaporating into the nitrogen gas, and leaves the nitrogen humidifier at a temperature in the range of about 150° to 250° F. The humidified nitrogen gas stream has a water content in the range of about 5 to 40 mole %, such as in the range of about 10 to 25 mole %, say about 15 mole %. The remainder substantially comprises nitrogen. In a preferable embodiment, the nitrogen gas stream is saturated with water in the nitrogen humidifier. The cooled water from the bottom of the nitrogen humidifier is reheated and recycled to the nitrogen humidifier by being pumped through one of a series of heat exchangers used to cool the stream of hot raw fuel gas that was previously produced in a partial oxidation gas generator at a temperature in the range of about 1800° to 3000° F. Advantageously, the raw fuel gas is thereby partially cooled on its way to an acid-gas recovery unit which, depending upon the acid-gas solvent, may be operated at a temperature in the range of about −40° to 300° F.

The water humidified nitrogen is separately introduced into the combustor of a combustion turbine at a temperature in the range of about 220° to 425° F. such as about 300° F. and a pressure in the range of about 200 to 300 psig, such as about 265 psig. Optionally, the water humidified nitrogen may have been preheated by indirect heat exchange with a hot stream e.g. steam or hot raw fuel gas produced in the partial oxidation gas generator. Air at a temperature in the range of about 400° to 900° F., such as about 750° F., and a pressure in the range of about 225 to 325 psig is separately introduced into the combustor. A stream of clean sulfur-free fuel gas produced downstream is separately introduced into the combustor at a temperature in the range of about 250° to 800° F., such as about 300° to 500° F., and a pressure in the range of about 225 to 325 psig. The volume ratio of water humidified nitrogen gas to clean sulfur-free fuel gas in the combustor is in the range of about 0.5 to 2.0, such as in the range of about 0.7 to 1.3, say about 1. Complete combustion takes place in the combustor at a temperature in the range of about 1800° to 2600° F., such as about 2300° F., and at a pressure of about 175 to 250 psig, such as about 220 psig. Substantially no $NO_x$ gases are produced. x is an integer in the range of about 1 to 3. By definition, the terms "substantially no" and "substantially reduced amount of $NO_x$ gases" means less than 20 parts per million (ppm), such as in the range of about 16 to 10 ppm, say 10 ppm or less. The term and/or is used herein in its usual way. For example, A and/or B means either A or B or A and B.

Substantially no $NO_x$ gases, are present in the flue gas. The stream of flue gas leaving the combustor is passed through a power-developing expansion turbine as the working fluid. For example, coupled through a variable-speed drive to the axis of the expansion turbine and driven thereby may be at least one electric generator and at least one turbocompressor. The addition to the flue gas of the supplemental amount of water humidified nitrogen increases the mass flow of the flue gas. Heat in the flue gas, which leaves the expansion turbine at a temperature in the range of about 1200° to 800° F. is recovered in a conventional heat recovery steam generator (HRSG). The cooled nontoxic flue gas may then be discharged as stack gas without polluting the environment.

One embodiment of the subject invention includes a power cogeneration feature with a steam turbine. Boiler feed water is passed through a coil in the HRSG in indirect heat exchange with the expanded flue gas. Steam at a pressure in the range of about 1000 to 2000 psig is produced and is passed through an expansion turbine as the working fluid. The expansion turbine drives a rotary mechanical or electrical device such as a compressor, pump, or electric generator. The spent wet steam is introduced into a condenser where it is fully condensed. The condensate in admixture with any make-up boiler feed water is pumped back to the HRSG by way of two successive heat exchangers. For example, in a first heat exchanger, the condensate may be preheated to a temperature in the range of about 120° to 220° F. by indirect heat exchange with black water vapors from the raw fuel gas scrubber. In a second heat exchanger the condensate, also referred to herein as boiler feed water (BFW), may be preheated to a temperature in the range of about 150° to 300° F. by indirect heat exchange with aforesaid raw stream of fuel gas which is produced in the process and which is on its way to the acid-gas recovery unit.

In the subject process, a continuous stream of hot fuel gas is produced by the partial oxidation of a gaseous or liquid hydrocarbonaceous or an aqueous slurry of solid carbonaceous fuel. The hot raw fuel gas from the partial oxidation gasifier is washed with water to remove entrained particulate matter and soot, passed through a plurality of indirect heat exchangers in series where the raw gas stream is cooled below the dew point, dewatered, and processed in an acid-gas recovery unit to remove sulfur-containing gases and optionally $CO_2$. The clean sulfur-free fuel gas is then separately introduced into the combustor of the combustion turbine as previously described. The partial oxidation reaction for producing the raw fuel gas is well known and takes place in a refractory lined reaction zone of a free-flow unpacked noncatalytic gas generator. The gas generator is preferably a vertical steel pressure vessel, such as shown in the drawing and described in coassigned U.S. Pat. No. 4,525,176.

A wide range of combustible carbon containing organic materials may be reacted in the gas generator with the oxygen and optionally in the presence of a temperature moderating gas to produce the raw fuel gas.

The term hydrocarbonaceous fuel as used herein to describe various suitable feedstocks to the partial oxidation gas generator is intended to include gaseous and/or liquid hydrocarbonaceous materials. In fact, substantially any combustible carbon containing organic material, or slurries thereof, may be included within the definition of the term "hydrocarbonaceous". Suitable liquid hydrocarbonaceous feedstocks include liquefied petroleum gas, petroleum distillates and residues, gasoline, naphtha, kerosine, crude petroleum, asphalt, gas oil, residual oil, tar sand and shale oil, coal oil, aromatic hydrocarbons (such as benzene, toluene, xylene fractions), coal tar, cycle gas oil from fluid-catalytic-cracking operation, furfural extract of coker gas oil, and mixtures thereof. Suitable gaseous hydrocarbonaceous fuels include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids, and by-products from chemical processes containing oxygenated hydrocarbonaceous organic materials and mixtures thereof.

The term solid carbonaceous fuel as used herein to describe various feedstocks is intended to include (1) pumpable slurries of solid carbonaceous fuels, such as coal, particulate carbon, petroleum coke, concentrated sewer sludge, shredded rubber tires and plastics, and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous and carbonaceous fuel may have a sulfur content in the range of about 0 to 10 weight percent and an ash content in the range of about 0 to 15 weight percent. The instant process is particularly suitable for sulfur-containing fuels. The preferred embodiment provides for the removal of sulfur-containing gases e.g. $H_2S$ and COS and optionally $CO_2$ from the raw stream of fuel gas.

A temperature moderator may be optionally used to control the temperature in the reaction zone of the partial oxidation gas generator. Suitable temperature moderators include $H_2O$, $CO_2$, a portion of the cooled clean flue gas exhaust from a gas turbine employed downstream in the process, by-product nitrogen from the air separation unit, and mixtures of the aforesaid temperature moderators.

A conventional 2, 3, 4 stream burner may be used to feed the partial oxidation gas generator with the stream of hydrocarbonaceous fuel or aqueous slurry of solid carbonaceous fuel at a temperature in the range of about ambient to 250° F., the stream of oxygen at a temperature in the range of about 100° to 400° F., and optionally the stream of temperature moderator at a temperature in the range of about 100° to 500° F. For further information, about these burners, reference is made to coassigned U.S. Pat. Nos. 3,743,606; 3,874,592; and 4,525,175.

The feedstreams are reacted by partial oxidation without a catalyst in the reaction zone of a free-flow gas generator at an autogenous temperature in the range of about 1800° to 3000° F. and at a pressure in the range of about 10 to 180 atmospheres absolute (atm.abs.). The reaction time in the fuel gas generator is about 1 to 10 seconds. The mixture of raw effluent fuel gas leaving the gas generator may have the following composition (mole percent-dry gases) if it is assumed that the rare gases are negligible; CO 15-57, $H_2$ 73-15, $CO_2$ 1.5-20, $CH_4$ 0.0-20, $N_2$ nil-1.0, $H_2S$ nil to 2.0 and COS nil to 0.1. Unreacted particulate carbon (on the basis of carbon in the feed by weight) is about 0.2 to 20 weight percent from liquid feeds but is usually negligible from gaseous hydrocarbon feeds. The raw fuel gas has a heat of combustion of about 150 to 300, say about 200 BTU per standard cubic foot (SCF).

The hot raw fuel gas leaves through a central outlet in the bottom of the vertical gas generator and passes into a gas cooler where the fuel gas is partially cooled to a temperature in the range of about 500° to 750° F. A portion of the slag and particulate matter entrained in the raw fuel gas stream drops out, for example into a pool of water located in the bottom of the gas cooler. Periodically, the water containing the slag and particulate matter is removed through a bottom outlet that leads to a lockhopper. Typical convection and radiant coolers are shown and described in coassigned U.S. Pat. Nos. 3,998,609; 4,328,006; 4,377,132; and 4,462,339. Alternatively, the hot raw fuel gas leaving the reaction zone of the gas generator may be cooled by being quenched in water contained in a quench tank. For example, a quench tank which is ordinarily located below the gas generator along the central longitudinal axis is shown and described in coassigned U.S. Pat. No. 4,801,307.

By-product steam is produced in the gas cooler at a temperature in the range of about 450° to 700° F. for use elsewhere in the proess. For example the aforesaid steam may be used as the working fluid in an expansion turbine for the production of power, or to drive the air compressor in the conventional air separation unit. The partially cooled stream of fuel gas leaving the gas cooler is passed into a gas cleaning zone where particulate carbon and any other entrained solids may be removed therefrom. Slurries of particulate carbon in water e.g. black water may be produced in the cleaning zone and may be recycled to the fuel gas generator in admixture with solid carbonaceous fuel as at least a portion of the feedstock. Any conventional procedure suitable for removing suspended solids from a gas stream may be used. In one embodiment of the invention, the stream of fuel gas is introduced into a gas-liquid scrubbing zone where it is scrubbed with a scrubbing fluid such as water. A suitable liquid-gas tray-type column is more fully described in Perry's Chemical Engineers' Handbook, Fourth Edition, McGraw-Hill 1963, Pages 18-3 to 5. Reference is also made to the gas scrubber in coassigned U.S. Pat. No. 3,232,728.

Thus, by passing the stream of process fuel gas up a scrubbing column in direct contact and countercurrent flow with a suitable scrubbing fluid or with dilute mixtures of particulate carbon and scrubbing fluid flowing down the column, the particulate carbon may be removed from the fuel gas. A slurry of particulate carbon and scrubbing fluid is removed from the bottom of the column and sent to a carbon separation or concentration zone. This may be done by any conventional means that may be suitable e.g. filtration, centrifuge, gravity settling, or by liquid hydrocarbon extraction such as the process described in coassigned U.S. Pat. No. 2,992,906.

Clean scrubbing fluid or dilute mixtures of scrubbing fluid and particulate carbon may be recycled to the top of the column for scrubbing more fuel gas.

Other suitable conventional gas cooling and cleaning procedures may be used in combination with or in place of the aforesaid scrubbing column. For example, the stream of fuel gas may be introduced below the surface of a pool of quenching and scrubbing fluid by means of a dip tube unit. Or the stream of fuel gas may be passed through a plurality of scrubbing steps including an orifice-type scrubber or venturi or nozzle scrubber, such as shown in coassigned U.S. Pat. No. 3,749,377.

Substantially no particulate carbon is produced with gaseous hydrocarbonaceous fuels, such as natural gas or methane. In such case, the aforesaid gas scrubbing step may not be necessary.

Recovery of the sensible heat in the clean raw fuel gas leaving the gas scrubber at a temperature in the range of about 300° to 450° F. is done step-wise by means of a plurality e.g. 2 to 5 indirect heat exchangers in series. The fuel gas is cooled below the dew point in each of the heat exchangers. A knockout drum follows most of the heat exchangers to collect the condensed water. In a preferred embodiment A, two raw fuel gas coolers are used in series with a clean sulfur-free fuel gas expander. This arrangement maximizes the heat recovery into the clean sulfur-free fuel gas since the expander cools the clean sulfur-free fuel gas between the two raw fuel gas coolers. In embodiment A, the cleaned raw fuel gas from the scrubber is cooled in a first indirect heat exchanger to a temperature in the range of about 350° to 500° F. followed by cooling in a second indirect heat exchanger to a temperature in the range of about 300° to 450° F. and below the dew point. The condensed water is collected in a first knockout drum and recycled to the gas scrubber as a portion of the washing fluid. Thus, as shown in the drawing clean sulfur-free fuel gas from the acid-gas recovery unit (1) enters the second heat exchanger e.g. Ref. No. 55 as the coolant at a temperature in the range of about 100° to 150° F. and a pressure in the range of about 400 to 1000 psig, (2) picks up heat from the raw fuel gas and leaves at a temperature in the range of about 200° to 400° F., (3) enters a power-developing expansion turbine where its pressure is reduced to about 250 to 350 psig, (4) enters the first heat exchanger where it is heated by indirect heat exchange with the raw fuel gas and leaves at a temperature in the range of about 250° to 400° F., and (5) separately enters the combustor of the combustion turbine.

In another embodiment B, said first and second indirect heat exchangers are by-passed by the stream of clean raw fuel gas from the gas scrubber. In such case, the stream of clean sulfur-free fuel gas from the acid-gas recovery unit is passed through an expansion valve to drop the pressure to about 250 to 350 psig, say to about 300 psig, prior to separately introducing the fuel gas into the combustor of said main combustion turbine. If the temperature of the stream of clean sulfur-free fuel gas is too low, it may be heated to a higher temperature prior to being introduced into the combustor. Next, the stream of raw fuel gas from embodiment B at a temperature in the range of about 350° to 500° F., or from embodiment A at a temperature in the range of about 250° to 400° F. is passed through a third heat exchanger in indirect heat exchange with cool water from the nitrogen humidifier. The cool water enters the third heat exchanger at a temperature in the range of about 150° to 250° F. and leaves at a temperature in the range of about 250° to 450° F.

The raw fuel gas is cooled to a temperature in the range of about 400° to 200° F. in the third heat exchanger and below the dew point. Condensed water is collected in a second knockout drum. The raw fuel gas is then passed through a fourth heat exchanger in indirect heat exchange with condensate from the steam cogeneration embodiment, as previously described, and thereby cooled to a temperature in the range of about 250° to 150° F. The condensed water is collected in a third knockout drum. Alternatively, the fourth heat exchanger and the third knockout drum may be by-passed by the stream of raw fuel gas. The raw fuel gas is cooled to a temperature in the range of about 120° to 100° F. and below the dew point by indirect heat exchange with cold water in a fifth heat exchanger. The condensed water is collected in a fourth knockout drum. The condensed water from the four knockout drums is sent to a water purification facility.

The cooled raw fuel gas enters a conventional acid-gas recovery unit where $H_2S$ and COS and optionally all or a portion of the $CO_2$ are removed. Further, should any other gaseous impurity be present in the raw fuel gas stream, it may be optionally removed at this time.

In the acid-gas recovery unit, suitable conventional processes may be used involving refrigeration and physical or chemical absorption with solvents, such as methanol, n-methylpyrrolidone, triethanolamine, propylene carbonate, or alternately with amines or hot potassium carbonate. The $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, free-flow non-catalytic refractory lined fuel gas generator 1, as previously described, is equipped with axially aligned upstream flanged inlet port 2 and downstream flanged exit port 3. Annulus type burner 4, with center passage 5 in alignment with the axis of gas generator 1 is mounted in inlet port 2. Central passage 5 has an upstream end 6 connected to substantially pure oxygen in line 7. Air in line 8 is separated in a conventional air separation unit 9 into the substantially pure oxygen in line 7 and dry nitrogen gas in line 10. A pumpable aqueous slurry of solid carbonaceous fuel in line 11 is passed through inlet 15 of burner 4 and down through concentric annular passage 16. The two feedstreams emerging from the downstream tip of burner 4 impact together, atomize, and react by partial oxidation in reaction zone 17 to produce fuel gas.

A conventional radiant cooler 18 comprising upstream central flanged inlet 19, downstream central flanged outlet 20, vertical water tube ring, flanged inlet 22 through which boiler feed water in line 23 is introduced is introduced into the bottom of water tube ring, flanged outlet 24 through which steam leaves from the top of cylindrically shaped water tube ring by way of line 25, flanged outlet 26 through which the cooled fuel gas leaves through line 27. Flanged exit port 3 of fuel gas generator 1 and flanged inlet port 19 of radiant cooler 18 are connected along the central axes of the generator 1 and cooler 18. The fuel gas produced in reaction zone 17 passes freely down through cylindrically shaped refractory lined connecting passage and is cooled by indirect radiant heat exchange with boiler feed water passing up through tube ring. Baffles 29 direct the partially cooled fuel gas out through outlet 26. Slag and ash are collected in a pool of cooling water 30 which is introduced into the bottom of radiant cooler 18. Periodically, by means of a conventional lock-hopper (not shown) slag, ash and water are removed through outlet 20, line 31, valve 32, and line 33.

The partially cooled raw fuel gas in line 27 is scrubbed clean of entrained particulate carbon in conventional gas scrubber 40. The fuel gas enters gas scrubber 40 through inlet 41 where it is directly contacted by scrubbing water which enters through inlet 42. The scrubbing water comprises condensate from line 43. The cleaned gas passes out through outlet 44 and line 45. The black-water e.g. slurry of water and particulate carbon passes out through bottom outlet 46 and line 47 and is used in the production of the aqueous slurry of solid carbonaceous fuel in line 11.

The clean partially cooled raw fuel gas in line 45 is cooled below the dew point. In a preferred mode, with valve 48 in by-pass line 49 closed and valve 50 in line 51 open, the clean partially cooled stream of fuel gas is passed through line 52, in direct heat exchanger 53, line 54, indirect heat exchanger 55, line 56, knock-out drum 57, line 58, open valve 59, lines 60 and 92, indirect heat exchanger 93, line 94, and knock-out drum 95. The condensed water collected in knock-out drum 57 is passed through line 61, open valve 62, lines 63 and 43, inlet 42, and into scrubbing column 40. When required, supplemental scrubbing water may be introduced through line 64, normally closed valve 65 and line 66. The coolant in heat exchangers -53 and 55 is clean sulfur-free fuel gas which leaves downstream acid-gas recovery unit 67 by way of line 68. Preferably, with valve 75 in line 76 closed and valve 77 in line 78 open, the fuel gas in line 68 is passed through line 78, valve 77, line 79, heat exchanger 55, line 80, and expansion turbine 81 which drives shaft 88 and electric generator 82. The expanded clean sulfur-free cooled fuel gas leaving turbine 81 through line 83, is warmed in indirect neat exchanger 53 and passed through lines 84, open valve 85, and lines 86 and 87 into combustor 90. In one embodiment, with valves 77 and 85 closed, the clean sulfur-free fuel gas is passed through line 76, expansion valve 75 and lines 74 and 87 into combustor 90. Optionally, when additional heating is required prior to combustion, the clean sulfur-free fuel gas in line 87 may be heated in a gas heater or in an indirect heat exchange zone (not shown). In one embodiment, the scrubbed fuel gas in line 45 by-passes heat exchangers 53 and 55. In such case, with valves 50 and 59 closed and valve 48 open, the fuel gas in line 45 is passed through line 49, valve 48, lines 91 and 92, indirect heat exchanger 93 where it is cooled below the dew point, line 94, and knock-out drum 95.

The coolant for heat exchanger 93 is water which enters through line 96 and leaves through line 97. The warmed water in line 97 is introduced near the top of nitrogen humidifier 100 and collects in a pool of water 101 at the bottom. Dry nitrogen enters through line 10 at the bottom of nitrogen humidifier 100 bubbles up through the pool of water 101 and leaves as water humidified or saturated nitrogen through line 102 at the top. The water vaporizing in humidifier 100 cools the water which leaves through lines 103 and 104 at the bottom. Pump 105 circulates the water in the coolant loop connecting heat exchanger 93 with nitrogen humidifier 100. Make-up water is introduced into said loop by way of line 106, valve 107, and line 108. With valve 115 in line 116 closed, saturated nitrogen in line 102 is introduced into combustor 90 by way of line 117, open valve 118, line 119, and line 120. Alternatively, the water humidified nitrogen gas in line 102 may be preheated prior to being introduced into combustor 90. For example, in one embodiment with valve 118 closed and valve 115 open, the water humidified nitrogen gas is passed through lines 102 and 116, valve 115, line 121, indirect heat exchanger 122, and lines 123 and 120. The heating fluid in heat exchanger 122 may be steam derived in the process, for example from line 25. The heating fluid enters through line 124 and leaves through line 125. In one embodiment an indirect heat exchanger (not shown) located in line 27 may be provided with a coolant loop that introduces hot heat exchange fluid into heat exchanger 122 where it heats up the water saturated nitrogen gas. The cooled heat exchange fluid is then returned to the indirect heat exchanger (not shown) in line 27.

A separate stream of substantially dry air in line 126 is introduced into combustor 90. The separate stream of clean dry sulfur-free fuel gas is burned by complete combustion in combustor 90 in the presence of a separate stream of humidified nitrogen from line 120. The humidified nitrogen enhanced stream of flue gas leaving combustor 90 by way of line 127 is passed through expansion turbine 128 as the working fluid. Electric generator 129 on shaft 130 is driven by expansion turbine 128. The hot expanded flue gas in line 131 is passed through heat recovery steam generator 132 (HRSG) where heat from the flue gas is extracted by indirect heat exchange with one or more cold streams. The cooled flue gas then passes through line 133 to stack. In one embodiment, boiler feed water in line 140 is passed by indirect heat exchange through coil 141 in HRSG 132 and is converted into steam. The steam in line 142 is passed through expansion turbine 143 as the working fluid. Electric generator 144 on shaft 145 is driven by expansion turbine 143. A mixture of condensate and steam in line 146 is passed into heat exchanger 194 where the steam is fully condensed by indirect heat exchange with cold water which enters through line 200 and leaves through line 201. Makeup water enters heat exchanger 194 through line 209, valve 210 and line 211. The condensate and makeup water are then introduced into and heated in heat exchanger 199 by way of line 196, condensate pump 197 and line 198. Flashed vapors e.g. $H_2O$, $NH_3$, $H_2S$ are separated from the hot black water in knockout drum 147. They are passed through line 205 into heat exchanger 199 where they are condensed heating the steam turbine condensate plus make-up from line 198. Condensed black water vapor is then sent to further treating and purification by way of line 206. The heated steam condensate and make-up water leaving heat exchanger 199 through line 149 is heated still further in heat exchanger 170. The heated condensate in line 195 is directed to the HRSG where it may enter through line 140. Black water leaves knock-out drum 147 through line 148 and is sent to a conventional carbon-recovery facility.

A partially cooled stream of fuel gas leaves through line 110 at the top of knock-out drum 95. In one embodiment, with valves 163 and 174 closed and valve 113 open, the stream of fuel gas in line 110 is passed through lines 160, 161 and 162. In one another embodiment where additional cooling of the fuel gas stream is required, valve 113 is closed, valves 163 and 174 are opened, and the fuel gas in line 110 is passed through line 165, valve 163, line 166, and indirect heat exchanger 170 where the stream of fuel gas is cooled below the dew point. The coolant for heat exchanger 170 is the condensate from line 149. The wet fuel gas is passed through line 171 into knock-out drum 172 where water is separated. The fuel gas is then passed through line 173, valve 174, line 175, line 162 and heat exchanger 177 where the fuel gas is cooled below the dew point. The coolant in indirect heat exchanger 177 is cold water, which enters through line 178 and leaves through line 179. The wet gas in line 180 is passed into knock-out drum 181 where water is separated. The dry fuel gas leaves through overhead line 182 and is introduced into a conventional acid-gas recovery unit 67 where sulfur-containing gases e.g. $H_2S$ and/or COS are removed. Optionally, at least a portion of the $CO_2$ in the gas stream may be also removed in acid-gas recovery unit 67. In one embodiment, the clean sulfur-free fuel gas in line 68 is introduced into combustor 90 by way of line 76, open valve 75, and lines 74 and 87 as previously described. The water condensate collected in the knock-out drum 95, 172, and 181 is passed respectively through lines 185 to 187; 188, 186 and 187; and 190 and 187, to a conventional water purification unit which may include an ammonia stripper. The purified condensate is then returned to the system as boiler feed water to make steam.

The process of the invention has been described generally and by examples with reference to liquid and gaseous hydrocarbonaceous and solid carbonaceous feedstocks and scrubbing fluids of particular compositions for purposes of clarity and illustration only. From the foregoing it will be apparent to those skilled in the art that various modifications of the process and the raw materials disclosed herein can be made without departure from the spirit of the invention.

I claim:

1. A process for producing power comprising:
    (1) cooling a stream of scrubbed raw fuel gas comprising $H_2$, CO, $H_2O$ and at least one acid gas selected from the group consisting of $CO_2$, $H_2S$, COS, and mixtures thereof, below the dew point in a plurality of separate indirect heat exchange means with a plurality of separate streams of coolant; separating condensed water from said raw fuel gas in a plurality of knock-out drums to produce dewatered raw fuel gas; wherein at least one stream of said coolant is water and said water is circulated in a closed loop between a nitrogen gas humidifying means where the temperature of said coolant water is reduced and at least one of said indirect heat exchange means where the temperature of said coolant water is increased to provide warm coolant water and the temperature of the stream of raw fuel gas is reduced;
    (2) directly contacting dry nitrogen gas at a temperature in the range of about 100° to 600° F. and a pressure in the range of about 200 to 500 psig with said warm coolant water from (1) in said nitrogen gas humidifying means thereby heating said nitrogen gas and humidifying it with water while simultaneously cooling the coolant water; and recycling the cooled coolant water to said indirect heat exchange means in (1) to cool said raw fuel gas stream;
    (3) scrubbing the dewatered raw fuel gas from (1) with an acid gas solvent in an acid gas removal zone thereby removing any sulfur-containing gases and optionally $CO_2$ from said fuel gas to produce dewatered sulfur-free fuel gas;
    (4) separately introducing the dewatered sulfur-free fuel gas stream from (3) and said stream of water humidified nitrogen gas from (2) into a combustion zone and burning the mixture with air to produce flue gas; and
    (5) passing the flue gas from (4) through an expansion turbine to produce power.

2. The process of claim 1 provided with the additional steps of: passing the expanded flue gas from (5) in indirect heat exchange with boiler feed water to produce steam; passing the steam through an expander to produce power and condensate; and passing the condensate through an indirect heat exchange means in (1) as one of said streams of coolant in indirect heat exchange with said raw stream of fuel gas.

3. The process of claim 1 provided with the additional steps of passing at least a portion of the dewatered sulfur-gas free fuel gas from (3) through a separate indirect heat exchange means in (1) as a coolant; expanding the dewatered sulfur-free fuel gas in an expansion turbine to produce power and simultaneously reduce its temperature and pressure; and passing the expanded dewatered sulfur-free fuel gas through another separate indirect heat exchange means in (1) as a coolant.

4. The process of claim 1 wherein in said combustion zone in (4) the volume ratio of water humidified nitrogen gas to clean sulfur-free fuel gas is in the range of about 0.5 to 2.0.

5. The process of claim 1 wherein said water humidified nitrogen gas comprises 5 to 40 mole percent $H_2O$.

6. A process for producing power comprising:
    (1) cooling scrubbed raw fuel gas comprising $H_2$, CO, $CO_2$, $H_2O$, $H_2S$ and COS by two successive stages of indirect heat exchange with a gaseous coolant comprising dry clean sulfur-free fuel gas in first and second indirect heat exchangers in series with expansion cooling of said gaseous coolant between said first and second heat exchangers; and condensing out and separating a first portion of the water from said stream of raw fuel gas;
    (2) cooling the raw fuel gas from (1) in a third indirect heat exchanger with a coolant; wherein said coolant is water and said water is circulated in a closed loop between (a) a nitrogen gas humidifier where a stream of dry nitrogen gas is saturated with a portion of said water which is thereby cooled, and (b) said third indirect heat exchanger where the water is warmed; and condensing out and separating a second portion of water from said stream of raw fuel gas; and removing water humidified nitrogen gas from said nitrogen gas humidifier;

(3) cooling the stream of raw fuel gas from (2) in one or more indirect heat exchangers with condensate from a steam turbine and/or cold water; and condensing out and separating water from said stream of raw fuel gas to produce a substantially dry stream of raw fuel gas;

(4) scrubbing the stream of dry raw fuel gas from (3) with an acid gas solvent in an acid gas removal zone thereby removing sulfur-containing gases from said stream of fuel gas to produce a dry clean sulfur-free stream of fuel gas; recycling said dry clean stream of sulfur-free fuel gas to said second indirect heat exchanger in (1) as said coolant; and (6) burning said dry clean sulfur-free fuel gas from said second indirect heat exchanger in (1) with air in the combustor of a combustion turbine while in the presence of said water humidified nitrogen from (2) so as to produce flue gas containing water saturated nitrogen gas and a substantially reduced amount of $NO_x$ gases; and passing said flue gas through an expansion turbine to produce power.

7. The process of claim 6 provided with the steps of introducing said coolant water from (2) into the top of said nitrogen gas humidifier in (2) at a temperature in the range of about 250° to 450° F.; introducing dry nitrogen gas into the bottom of said nitrogen gas saturator at a temperature in the range of about 100° to 600° F. and a pressure in the range of about 200 to 500 psig; bubbling said nitrogen gas up through a pool of water in the bottom of said nitrogen gas humidifier; removing nitrogen gas saturated with water from the top of said nitrogen gas humidifier at a temperature in the range of about 150° to 250° F.; and separately introducing said nitrogen gas humidified with water into said combustor in (6).

8. A process for producing power comprising:
(1) separating air in an air separation unit into a stream of substantially pure oxygen gas and a stream of dry nitrogen gas;
(2) reacting by partial oxidation in a free flow gas generator a stream of hydrocarbonaceous fuel with or without a temperature moderator, or an aqueous slurry of solid carbonaceous fuel with said stream of substantially pure oxygen from (1) at a temperature in the range of about 1800° to 3000° F. and a pressure in the range of about 10 to 180 atmospheres to produce a stream of raw fuel gas comprising $H_2$, $CO$, $H_2O$ and at least one acid gas selected from the group consisting of $CO_2$, $H_2S$, $COS$, and mixtures thereof:
(3) partially cooling the stream of raw fuel gas from (2) and scrubbing the cooled gas stream with water to produce a clean raw fuel gas stream; cooling said clean raw fuel gas stream below the dew point in a plurality of separate indirect heat exchange means with a plurality of separate streams of coolant; separating condensed water from said clean raw fuel gas in a plurality of knock-out drums to produce a stream of dewatered clean raw fuel gas; wherein at least one stream of said coolant is water and said water is circulated in a closed loop between a dry nitrogen gas humidifying means where the temperature of said coolant water is reduced and at least one of said indirect heat exchange means where the temperature of said coolant water is increased to provide warm coolant water and the temperature of the stream of clean raw fuel gas is reduced;
(4) directly contacting said stream of dry nitrogen gas from (1) at a temperature in the range of about 100° to 600° F. and a pressure in the range of about 200 to 500 psig with said warm coolant water from (3) in said nitrogen gas humidifying means thereby heating said nitrogen gas and saturating it with water while simultaneously cooling the coolant water; and recycling the cooled coolant water to said indirect heat exchange means in (3) to cool said raw fuel gas stream;
(5) scrubbing the stream of dewatered clean raw fuel gas from (3) with an acid gas solvent in an acid gas removal zone thereby removing any sulfur-containing gases and optionally $CO_2$ from said fuel gas to produce a stream of dewatered clean sulfur-free fuel gas;
(6) separately introducing the stream of dewatered clean sulfur-free fuel gas stream from (5) and said stream of water saturated nitrogen gas from (4) into the combustor of a combustion turbine and burning said fuel gas stream with air to produce flue gas containing water humidified nitrogen gas and substantially no $NO_x$ gases; and
(7) passing the flue gas from (6) through an expansion turbine to produce power and expanded flue gas.

9. The process of claim 8 provided with the additional steps of: passing the expanded flue gas from (7) in indirect heat exchange with boiler feed water to produce steam; passing said steam through an expander to produce power and condensate; and passing the condensate through an indirect heat exchange means in (3) as one of said streams of coolant in indirect heat exchange with said raw stream of fuel gas.

10. The process of claim 8 provided with the additional steps of passing at least a portion of the dewatered clean sulfur-free fuel gas from (5) through a separate indirect heat exchange means in (3) as a coolant; expanding the dewatered sulfur-free fuel gas in an expansion turbine to produce power and simultaneously reduce its temperature and pressure; and passing the expanded dewatered sulfur-free fuel gas through another separate indirect heat exchange means in (3) as a coolant.

11. The process of claim 8 wherein said saturated nitrogen gas is introduced into the combustion zone in (6) at a pressure which is in the range of about 25 to 50 psig less than the pressure at which said stream of dewatered clean sulfur-free fuel gas is introduced into said combustion zone.

12. The process of claim 8 wherein said saturated nitrogen gas contains about 5 to 40 mole % of water.

13. The process of claim 8 wherein said dewatered clean sulfur-free fuel gas is introduced into said combustion zone in (6) at a temperature in the range of about 250° to 800° F. and a pressure in the range of about 225 to 325 psig; and said water humidified nitrogen gas is introduced into said combustion zone in (6) at a temperature in the range of about 220° to 425° F. and a pressure in the range of about 200 to 300 psig.

14. The process of claim 8 wherein the volume ratio of water humidified nitrogen gas to clean sulfur-free fuel gas in said combustion zone in (6) is in the range of about 0.5 to 2.0.

15. The process of claim 8 wherein the flame temperature in the combustion zone in (6) is in the range of about 1800° to 2600° F. and the pressure is in the range of about 175 to 250 psig.

16. The process of claim 9 where in step (3) particulate matter and soot are scrubbed from said stream of raw fuel gas with water in a gas scrubbing zone; separating hot black water from the scrubbed gas stream; separating hot vapors from said black water; and passing said hot vapors in indirect heat exchange with said steam condensate.

* * * * *